2,736,735

TETRACYCLINE ANTIBIOTIC ZIRCONIUM HYDROXYACID COMPLEXES

George Herman Michel, Dumont, and Clifford Everett Petersen, Hillsdale, N. J., and Merton Cooke Lockhart, Pearl River, N. Y., assignors to American Cyanamid Company, New York, N. Y., a corporation of Maine No Drawing. Application July 8, 1952,
Serial No. 297,768

5 Claims. (Cl. 260—429)

This invention relates to complexes formed by the reaction of amphoteric, broad-spectrum antibiotics, such as chlortetracycline and oxytetracycline and zirconyl derivatives of alpha hydroxy carboxylic acids, and the method of making them.

In the production, purification, and formulation of antibiotics, it is desirable to obtain non-toxic water soluble derivatives, preferably injectable, as such derivatives are useful in the separation of the antibiotic from the fermentation broth in which it occurs, in purifying and recovering the antibiotic, and in preparing the antibiotic in a form which is therapeutically acceptable by the particular route desired for administration.

Broad spectrum amphoteric antibiotics such as chlortetracycline and oxytetracycline are useful in the treatment of a number of pathological conditions and it is desired to administer such antibiotics topically, orally and parenterally. The required characteristics for such administration by these varied routes render it quite difficult and frequently impossible to prepare the antibiotic in a form which will possess all of the desirable attributes.

Our chlortetracycline zirconium alpha hydroxy carboxylic acid complexes may be used topically as for example by admixing with an ointment base or mixing with a coating material such as film-forming carboxymethylcellulose compositions or may be used in suspensions or solutions in water or other liquids. Neutral zirconium derivatives of hydroxy aliphatic acids have been used as deodorants and antiperspirants as is disclosed in U. S. patent to Van Mater No. 2,498,514 entitled "Zirconium Compound Deodorant and Antiperspirant." Other zirconium compounds have been used for topical administration, as for example, zirconium carbonate as exemplified in U. S. patent to Eugene Wainer No. 2,507,128 entitled "Antiperspirant Composition." For topical administration, the zirconium complexes may have additional advantages as, for example, in the treatment of poison ivy. The use of zirconium complexes for this purpose is described in an article by Warren B. Blumenthal entitled "Some Features of Zirconium Chemistry," Journal of Chemical Education, vol. 26, pages 472–475 (September 1949).

A composition which has the therapeutic efficiency of the antibiotic chlortetracycline and the curative effect of zirconyl complexes towards the irritating components of poison ivy is of particular value, particularly if the skin becomes broken in the affected area.

Additionally, these complexes may be used in the isolation and purification of the broad-spectrum antibiotics and may be used in preparing liquid mixtures or solid compositions which are to be administered orally.

Further, these complexes may be used as a component for ointments, salves, tinctures, solutions and dressings which are to be used for topical administration to a desired area.

Zirconium is a fairly uncommon element which is becoming of increased importance because of improved methods of separating the zirconium and because of its characteristics of neutralizing harmful radioactive products in the body.

Zirconium as found in nature usually contains several percent of hafnium. For the purposes of the present invention, zirconium compounds containing corresponding hafnium compounds are normally used because they are commercially available forms. Pure zirconium derivatives may be used when obtainable. Hafnium itself in pure form can be used, but is not commercially available at present. For the purposes of description in this specification, including the examples, the zirconium compounds are the commercially available products which contain an appreciable percentage of hafnium. These two elements are probably the most similar of any known pair of elements and cannot be separated by ordinary simple chemical methods.

A purified zirconyl chloride (also called zirconium oxychloride) may be purchased or a technical grade may be recrystallized to obtain a therapeutically acceptable grade. Other zirconyl halogen derivatives may be used, but commercial availability dictates a clear preference for the chloride. The zirconyl chloride normally is sold as a hydrate and if various hydrates are used, corresponding corrections must be made in the weights to allow for the presence of water.

To prepare our new complexes, the zirconyl halides are dissolved in water along with an alpha hydroxy carboxylic acid. Among such acids may be mentioned citric, gluconic, choline dihydrogen citrate, tartaric, lactic, malic, ascorbic, mandelic, and also such acids as pyruvic which have alpha hydroxy tautomeric form. Readily soluble salts and readily hydrolizable esters of such acids may of course be used as by reaction they supply the acid itself.

Most conveniently the alpha hydroxy carboxylic acid or its salt is dissolved in water, and the zirconyl halide is also dissolved in water, and the two solutions mixed. Of course, the materials may be mixed before solution or mixed with the water in any order which is convenient. More rapid manipulation is convenient if each of these materials is dissolved in water before their admixture with each other. The pH of the mixture is then adjusted until preferably slightly alkaline with a base such as sodium hydroxide. As set forth in the Van Mater patent, the zirconyl alpha hydroxy acid complex may be insoluble if too acid, but dissolves at higher pH values. To this clear solution may then be added chlortetracycline. The chlortetracycline may be added as its hydrohalide salt or salt with other mineral acids or as a neutral chlortetracycline or as an alkali or amine salt. The pH of the resulting solution may then be adjusted to near neutral, preferably within the range of about 6–10 and the solution filtered to clarify. Decolorizing carbon may be used. We prefer to adjust the solution to a pH which is fairly close to the pH of the blood stream; namely, about 7.4. The solution as formed contains the halide salt of the alkaline material used for pH adjustment, which may be sodium chloride, and is innocuous.

The clear chlortetracycline zirconium alpha hydroxy complex may be used or administered as such or may be separated from the solution by diluting out with acetone or other water miscible organic solvent which causes the chlortetracycline zirconyl alpha hydroxy complex to be thrown out of solution. The precipitate may be separated, washed, and dried. The dry complex is storage stable, may be sterilized by heating with only a slight loss or may be sterilized by ethylene oxide or other chemical treatment. The dried complex may be dissolved in water. The solution may be administered parenterally or orally or applied topically as required by the condition of a particular subject. The dried material may be administered in capsules or tablets or may be suspended in an ointment base or other form for local administration.

Certain specific examples of particular preparations by way of illustration follow.

EXAMPLE 1

*Chlortetracycline zirconium gluconate complex*

4 grams of glucono delta lactone were dissolved in 50 ml. of distilled water and the solution adjusted to a pH of 11.5 with 20% sodium hydroxide. A second solution was prepared containing 6.4 grams of crystalline zirconyl chloride octahydrate dissolved in 50 ml. of distilled water. The two solutions were mixed and the pH adjusted to 7.3 with 20% sodium hydroxide. Thereto was then added 2.89 grams of chlortetracycline hydrochloride. The pH was then adjusted to 7.4 with 20% sodium hydroxide, which gave a clear solution. The solution was filtered to insure the removal of traces of impurities. To clear filtrate was added one liter of acetone thereby causing the precipitation of the neutral chlortetracyline zirconium gluconate complex. The composition was filtered and the precipitate washed with 100 ml. of acetone and then dried in a vacuum oven at 40° C. overnight. 9.9 grams of neutral chlortetracycline zirconium gluconate complex was obtained which upon analysis was found to have an chlortetracycline activity equal to the activity of 234 micrograms of chlortetracycline hydrochloride per mg. of the complex. For purposes of convenience, pure chlortetracycline hydrochloride is used as a standard, with a value of 1000 micrograms per mg., and other chlortetracycline containing products rated on their activity relative to this standard.

EXAMPLE 2

*Chlortetracycline zirconium citrate complex*

A solution was prepared by dissolving 3.7 grams of sodium citrate ($Na_3C_6H_5O_7.2H_2O$ molecular weight 294.12) in 100 ml. of water and thereto was added a solution prepared by dissolving 8 grams of zirconyl chloride octahydrate in 100 ml. of water. The pH of the resulting complex in solution was adjusted to 7.1 with 20% sodium hydroxide. To the mixture was then added 3.2 grams of chlortetracycline hydrochloride with constant stirring and the pH then adjusted with 20% sodium hydroxide to 7.4 The solution was filtered to insure clarity and to the clear solution was added one liter of acetone. A precipitate formed which was separated from the solution, washed with 100 cc. of acetone and dried overnight at 40° C. The resulting chlortetracycline zirconium citrate weighed 8.9 grams and showed a chlortetracycline activity of 246 mcg./mg.

EXAMPLE 3

*Chlortetracycline zirconium gluconate complex*

A mixture was prepared of 3.25 grams of zirconyl chloride octahydrate in 100 ml. of water and thereto added a solution of 4 grams of gluconic acid in 100 ml. of water. The pH of the mixture was adjusted to 7.0 with dilute sodium hydroxide and to the solution was added 5 grams of chlortetracycline hydrochloride and the pH then adjusted to 7.2 with sodium hydroxide. The solution was filtered to insure clarity and thereto added 700 ml. of acetone. The precipitate which formed was filtered off, washed with 50 ml. of acetone and dried under a vacuum. The chlortetracycline zirconium gluconate complex obtained weighed 4.9 grams and showed an activity of 273 mcg./mg.

EXAMPLE 4

*Chlortetracycline zirconium citrate complex*

16.4 grams of zirconyl chloride octahydrate was mixed with 250 ml. of distilled water, and thereto added a solution of 10 grams of sodium citrate in 250 ml. of water. The pH of the mixture was adjusted to 7.0 with sodium hydroxide and the solution filtered to insure its clarity. To the clear solution was then added 10.5 grams of chlortetracycline hydrochloride and the pH then adjusted to 7.0 with dilute sodium hyroxide. The solution was filtered to insure clarity and mixed with 3 liters of acetone. The precipitate which formed was filtered out, washed with 100 ml. of acetone and dried overnight under vacuum at 40° C. The chlortetracycline zirconium citrate complex thereby formed weighed 20.4 grams and showed an activity of 287 mcg./mg.

EXAMPLE 5

*Oxytetracycline zirconium citrate complex*

A solution was prepared by dissolving 1.65 grams of zirconyl chloride in 25 ml. of water and to this was added a solution of 0.75 grams citric acid in 25 ml. of water. The pH of the combined solutions was adjusted to 7.0 with sodium hydroxide and thereto added one gram of oxytetracycline hydrochloride. The pH was then adjusted to 7.0 with dilute sodium hydroxide and the solution filtered to remove any impurities and insure clarity. The solution was mixed with 500 ml. of acetone and the precipitate which formed was separated, washed with acetone, and dried under vacuum overnight at 40° C. 1.7 grams of oxytetracycline zirconium citrate complex was thereby obtained.

BLOOD LEVELS IN DOGS

Solutions were prepared using chlortetracycline zirconium citrate complex from Example 2 and chlortetracycline zirconium gluconate complex from Example 1 at a concentration level of 100 mg. of chlortetracycline activity per cc of solution by dissolving respectively 406. mg./ml. of the chlortetracycline zirconium citrate complex and 427. mg./ml. of chlortetracycline zirconium gluconate complex in water. For comparison purposes, a suspension was prepared containing 100 mg./ml. of chlortetracycline hydrochloride, buffered with sodium glycinate. The solutions and the suspension were injected into a test dog. A quantity of the solution or suspension such that 5 mg. of chlortetracycline activity per lb. of body weight of the dog, was injected. The following table shows the blood levels obtained:

| Hours After Injection | Chlortetracycline HCl | Chlortetracycline Zirconium Citrate | Chlortetracycline Zirconium Gluconate |
| --- | --- | --- | --- |
| 0 | 0.05 | 0.05 | 0.05 |
| 1 | 0.5 | 4.0 | 4.0 |
| 2 | 0.5 | 2.0 | 2.0 |
| 4 | 0.5 | 1.6 | 2.0 |
| 7 | 0.25 | 0.8 | 1.0 |
| 12 | 0.2 | 0.8 | 0.8 |
| 24 | 0.1 | 0.4 | 0.4 |

The chlortetracycline zirconium alpha hydroxy carboxylic acid complexes were readily acceptable. The chlortetracycline hydrochloride when injected intra-muscularly caused so much irritation as to be unsuitable for clinical use.

Our complex was found to form in accordance with previous examples using lactic acid, tartaric acid, mandelic acid, pyruvic acid, choline dihydrogen citrate, d-xylose, d-mannose and d-glucose, or their salts.

The pH adjustment may be made with sodium hydroxide, potassium hydroxide, ammonium hydroxide or therapeutically acceptable non-toxic amines as for example set forth in the Van Mater Patent No. 2,498,514. We prefer to use sodium hydroxide, as the sodium halide, preferably chloride, then formed, is soluble, and innocuous.

As our invention we claim:

1. A complex of a broad spectrum tetracycline type antibiotic selected from the group consisting of chlortetracycline and oxytetracycline with a zirconium salt of carboxylic acid selected from the group consisting of citric acid, gluconic acid, tartaric acid, lactic acid, malic acid, ascorbic acid, mandelic acid and pyruvic acid.

2. The process of preparing a complex of broad spectrum tetracycline type antibiotic selected from the group consisting of chlortetracycline and oxytetracycline with a zirconium salt of a carboxylic acid selected from the group consisting of citric acid, gluconic acid, tartaric acid, lactic acid, malic acid, ascorbic acid, mandelic acid, and pyruvic acid which comprises dissolving a compound selected from the group consisting of chlortetracycline and oxytetracycline, and their water soluble non-toxic salts in an aqueous solution of a salt selected from the group consisting of the zirconium salts of citric acid, gluconic acid, tartaric acid, lactic acid, malic acid, ascorbic acid, mandelic acid, and pyruvic acid at a pH of between approximately 6 and 10.

3. The complex, chlortetracycline zirconium citrate.
4. The complex, chlortetracycline zirconium gluconate.
5. The complex, oxytetracycline zirconium citrate.

References Cited in the file of this patent

UNITED STATES PATENTS

| | | |
|---|---|---|
| 2,516,080 | Sobin et al. | July 18, 1950 |
| 2,603,584 | Pidacks | July 15, 1952 |

OTHER REFERENCES

Weidenheimer, Ser. No. 83,780, abstract published Sept. 18, 1951, vol. 650, page 895, Official Gazette.